US007478835B2

(12) United States Patent
Autenrieth

(10) Patent No.: US 7,478,835 B2
(45) Date of Patent: Jan. 20, 2009

(54) TRAVEL UNIT FOR MOBILE MACHINES

(75) Inventor: Oliver Autenrieth, Kirchdorf/Iller (DE)

(73) Assignee: Liebherr-Hydraulikbagger, Kirchdorf/Iller (DE)

( * ) Notice: Subject to any disclaimer, the term of this patent is extended or adjusted under 35 U.S.C. 154(b) by 249 days.

(21) Appl. No.: 11/089,638

(22) Filed: Mar. 25, 2005

(65) Prior Publication Data

US 2005/0211862 A1 Sep. 29, 2005

(30) Foreign Application Priority Data

Mar. 25, 2004 (DE) .................. 20 2004 004 714 U

(51) Int. Cl.
*B60S 9/14* (2006.01)
*B60S 9/21* (2006.01)

(52) U.S. Cl. .................. 280/763.1; 280/766.1; 280/767

(58) Field of Classification Search .............. 280/763.1, 280/764.1, 765.1, 766.1, 6.153–156, 6.15, 280/6.154, 6.155, 6.156
See application file for complete search history.

(56) References Cited

U.S. PATENT DOCUMENTS 4,241,803 A * 12/1980 Lauber ....................... 180/8.1
4,265,326 A * 5/1981 Lauber ....................... 180/8.3
4,394,913 A 7/1983 Lanning et al.
4,496,062 A * 1/1985 Gattu et al. ................. 212/302
4,555,031 A * 11/1985 Blase et al. ................. 212/302
5,029,895 A * 7/1991 Anderson ................ 280/764.1

FOREIGN PATENT DOCUMENTS

| | | |
|---|---|---|
| DE | FR 12 09 259 | 1/1966 |
| DE | 1928712 | 12/1969 |
| DE | 2142750 | 4/1973 |
| DE | 3336638 | 4/1984 |
| DE | 3408172 | 9/1984 |
| EP | 1008549 | 6/2000 |
| EP | 1 382 560 | 1/2004 |
| FR | 1494349 | 9/1967 |
| GB | 2 135 273 | 8/1984 |

* cited by examiner

*Primary Examiner*—Christopher P Ellis
*Assistant Examiner*—Vaughn T Coolman
(74) *Attorney, Agent, or Firm*—Dilworth & Barrese LLP

(57) ABSTRACT

The invention relates to a mobile unit for mobile machines having extensible support devices comprising a first, continuous rigid support on which travel devices and some of the support devices are arranged and on which a further continuous support or divided support arms, which support the remaining support devices, are outwardly pivotably linked. In accordance with the invention, the first, continuous rigid support is aligned at an angle to the imagined longitudinal axis of the mobile unit and the further continuous support or the divided support arms are aligned with point symmetry to a real or imagined pivot point on the continuous rigid support, with them likewise supporting travel devices.

12 Claims, 2 Drawing Sheets

TRAVEL UNIT FOR MOBILE MACHINES

BACKGROUND OF THE INVENTION

Figure 1:
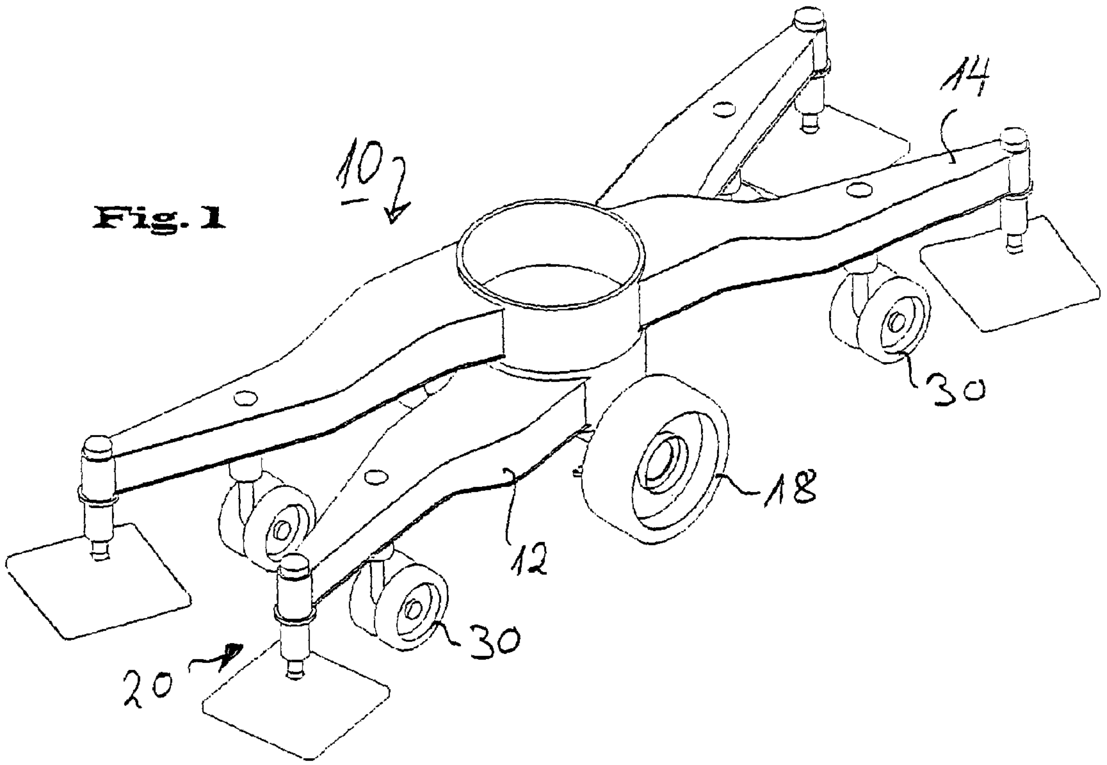

The invention relates to a travel unit for mobile machines having extensible support devices.

Mobile machines such as hydraulic excavators, cable-operated excavators and other earthmovers and/or transfer units usually have a travel unit at which the travel devices, that is, for example, the wheels or, for example, crawlers, are arranged. The travel unit furthermore as a rule has a receiving plate for a turntable support on which the rotating deck with slewing gear belonging to the superstructure can be placed. This known design requires a large production effort in particular due to the extensive components and support positions.

In another respect, the track width of the machine is, as a rule, fixed by the mobile unit and the running gear linked to it.

A mobile crane is known from DE 34 08 172 C comprising a mobile unit. A crane movable on rubber-tired wheels and having a main frame which simultaneously forms the mobile unit is described here. Support feet which can be lowered to the ground are provided on the main frame, on the one hand. Furthermore, four support booms are linked to the main frame and can be moved from a folded position into an unfolded position. The support booms also bear corresponding support feet.

SUMMARY OF THE INVENTION

It is the object of the present invention to further develop a mobile unit of the generic type such that support positions and components can be saved and thus a lower production effort is made possible which results in a minimization of manufacturing costs.

This object is solved in accordance with the invention by the combustion of the features herein. Accordingly, a mobile unit for mobile machines having extensible support device is equipped with a first, continuous rigid support on which some of the support devices are arranged and on which a further continuous support and the divided support arms, which support the remaining support devices, are outwardly pivotally linked. In accordance with the invention, the first, continuous rigid support is aligned at an angle to the imagined longitudinal axis of the mobile unit and the further continuous support or the divided support arms are aligned with point symmetry to a real or imagined pivot point on the continuous rigid support, with them likewise supporting travel devices. This new design distances itself from the customary construction concept of the mobile unit, which consisted, as a rule, of a complex welding design with longitudinal supports arranged rigidly with respect to one another and transverse supports connecting them together on which the turntable is supported. Since the support devices are arranged directly on the continuous rigid support and on the continuous support connected to it or on the linked divided support arm, a direct flow of force from the superstructure into the support devices is made possible, which represents a technical implementation of the tree root principle. This manner of design saves support positions and components, which results, on the one hand, to a lower production effort and thus also to lower manufacturing costs. Due to the inclined and thus asymmetric alignments of the first support and of the corresponding point-symmetrical association of either the second rigid support of the correspondingly linked divided support arms, with the later each likewise supporting driving devices, a variable track width is possible by a pivoting of the supports with respect to one another. This variable track width can also be set under load. In desired positions, the whole mobile unit can be supported by a corresponding extension of the support apparatus.

Preferred aspects of the invention result from the description herein.

The continuous rigid support can thus be connected to the second continuous rigid support via a rotary joint at the real pivot point. A main travel device can be arranged in the region of the connection axis between the two supports, with additional auxiliary travel devices in the form of support rollers then being able to be arranged on the respective supports.

In accordance with an alternative embodiment, the continuous rigid support is connected to two supports which can be outwardly pivoted to the side.

The supports can advantageously receive actively steered wheel sets as travel devices.

In accordance with a further advantageous embodiment of the invention, the further continuous support or the divided support arms can be pivoted outwardly via drive means such as piston-in-cylinder arrangements, threaded spindles or transmissions. The further continuous support or the divided support arms can be fixable in their respective position via fixing means such as multi-plate brakes or bolts.

BRIEF DESCRIDTION OF THE DRAWINGS

Figure 2:
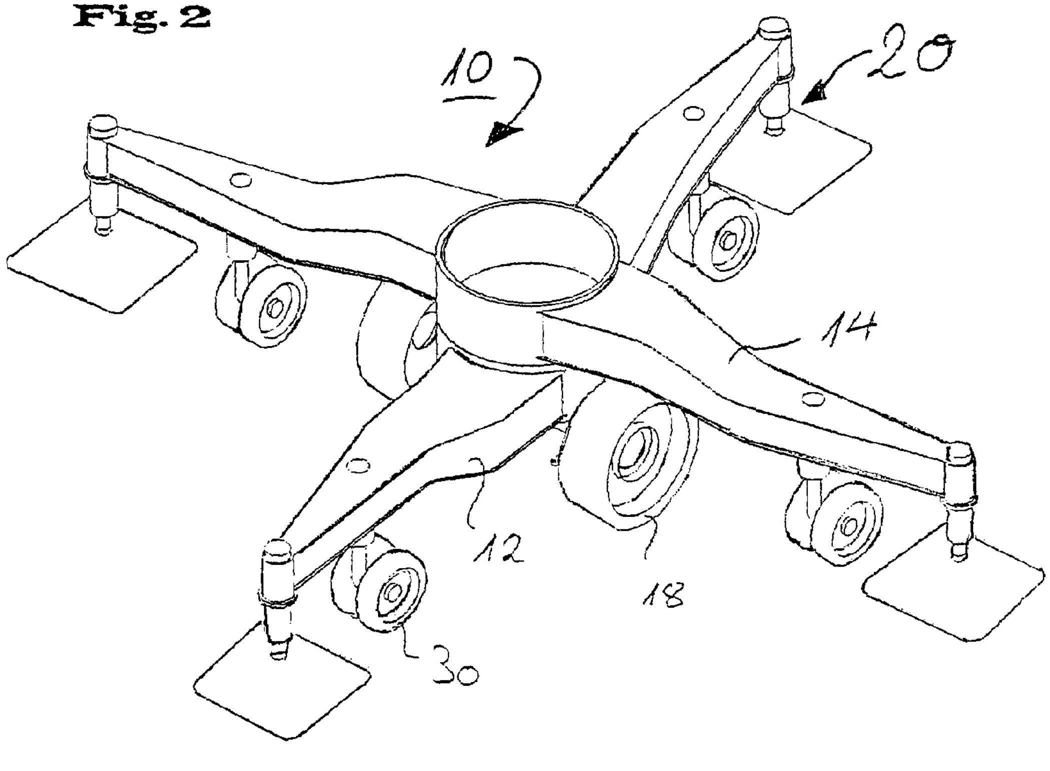
Figure 3:
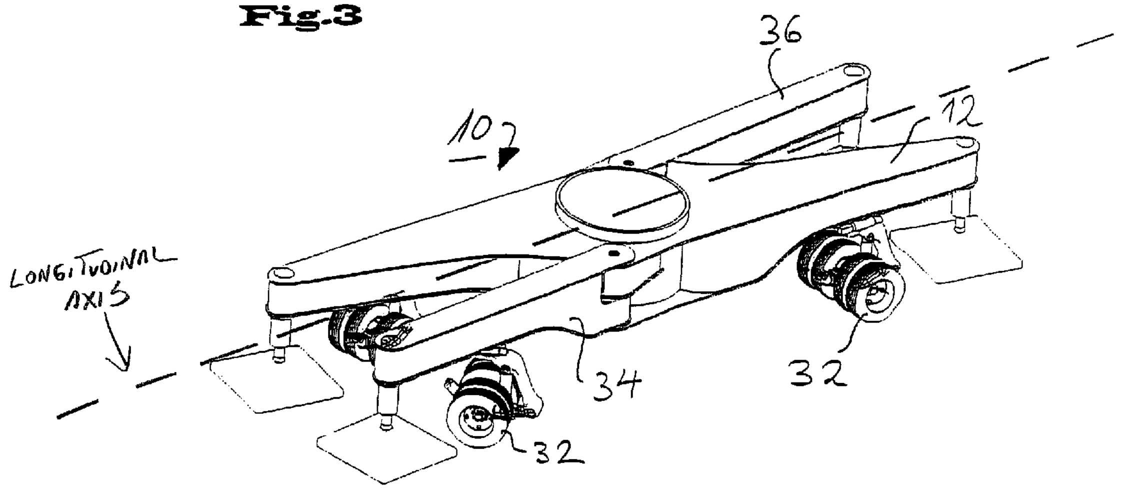
Figure 4:
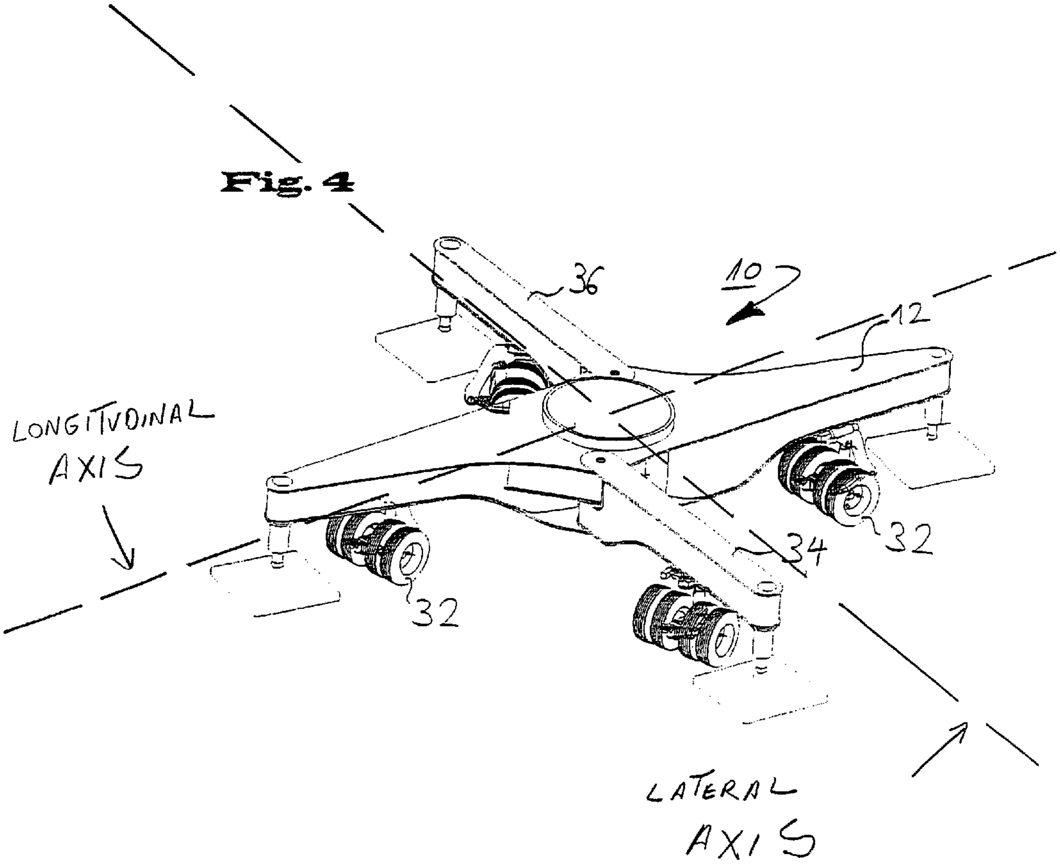

Further features, details and advantages of the invention will be explained in more detail with reference to embodiments shown in the drawing. There are shown:

FIG. 1: a first embodiment of the mobile unit in accordance with the invention in travel position;

FIG. 2: an embodiment in accordance with FIG. 1 in working position;

FIG. 3: a second variant of the mobile unit in accordance with the invention in travel position; and FIG. 4: the variant of the invention in accordance with FIG. 3 in working position.

DESCRIDTION OF THE PREFERRED EMBODIMENTS

A first variant of a mobile unit 10 is shown in FIGS. 1 and 2 which has a rigid continuous support 12 which is pivotably connected to a second continuous rigid support 14 via a rotary joint not shown more closely in detail here. Support devices 20, which substantially consist of support plates 22 which can be extended or retracted via adjustment devices 24, are arranged on or after the respective ends of the continuous rigid supports 12 and 14.

The continuous rigid supports 12 and 14, which are connected to one another via spherical turntables, each have turntable supports 26 at their centers. The rotating deck of the superstructure of the machine can be placed in the usual manner on the turntable support 26 of the rigid continuous support 14. Since these are known designs, this is not shown in any more detail in the drawing.

A single wheel drive with individual wheels 18 is arranged by means of a further rotary joint which is not shown in any more detail here and which is arranged in an axis with the previously named rotary joint. Only two individual wheels are present in the current case. The driving stability results from a respective four support rollers 30 which are each arranged at the arms of the rigid supports 12 or 14. In FIG. 3, the mobile unit is shown in a travel position, whereas in FIG. 4, the mobile unit is shown in the working position in which the rigid supports 12 and 14 are pivoted toward one another and in a support position. The rigid supports 12 and 14 are pivoted so far that they adopt an almost right angle with respect to one another.

As shown in FIG. 1, the first continuous rigid support 12 is not aligned in the imagined longitudinal axis of the mobile unit, but at an angle thereto so that an asymmetric arrangement results with respect to a possible axis symmetry to the imaged longitudinal axis of the mobile unit. The second continuous support 14 is arranged with point symmetry to the first support arm 12 with respect to the actually present pivot point in FIG. 1.

A similar symmetry results from the design of the mobile unit in accordance with FIG. 3. It has a likewise asymmetric, continuous rigid support 12 on which divided support arms 34 and 36 are each pivotably linked. They are linked with point symmetry around an imagined pivot point. A pivoting of the support arms takes place in a manner not shown in any more detail here via adjustment devices, with them being able to include drive means such as piston-in-cylinder arrangements, threaded spindles or transmissions. The divided support arms shown here can be fixed in their respective position via fixing means such as multi-plate brakes or, in the simplest case, bolts (also not shown individually here).

In the embodiment shown here, active linked wheel sets 32 are arranged on the respective support arms.

The invention claimed is:

1. A mobile unit for mobile machines having extensible support devices and comprising a first continuous rigid support on which travel devices and some of the support devices are arranged, divided support arms, which support a remainder of the support devices and are outwardly pivotally linked on the first continuous rigid support, wherein the mobile unit comprises a longitudinal axis bisecting the entire mobile unit in a retracted or closed state, the first continuous rigid support is askew to the longitudinal axis at all times, and the divided support arms are aligned with point symmetry to a real or imagined pivot point on the first continuous rigid support and also support travel devices.

2. The mobile unit of claim 1, wherein the divided support arms (34, 36) are each coupled to the first continuous rigid support (12) at respective pivot points to define a lateral axis perpendicular to the longitudinal axis when fully-pivoted away from the continuous rigid support (12) and the divided support arms (34, 36) are parallel to and offset from the lateral axis.

3. The mobile unit of claim 2, wherein the divided support arms (34, 36) each extend parallel to the longitudinal axis when fully-retracted.

4. The mobile unit of claim 3, wherein the support devices are retractable and extendable support plates (22).

5. The mobile unit of claim 2, wherein the support devices are retractable and extendable support plates (22).

6. A mobile unit for mobile machines in accordance with claim 1, comprising actively steered wheel sets as the travel devices.

7. The mobile unit of claim 6, wherein the divided support arms (34, 36) each extend parallel to the longitudinal axis when fully-retracted.

8. The mobile unit of claim 7, wherein the support devices are retractable and extendable support plates (22).

9. The mobile unit of claim 6, wherein the support devices are retractable and extendable support plates (22).

10. The mobile unit of claim 1, wherein the divided support arms (34, 36) each extend parallel to the longitudinal axis when fully-retracted.

11. The mobile unit of claim 10, wherein the support devices are retractable and extendable support plates (22).

12. The mobile unit of claim 1, wherein the support devices are retractable and extendable support plates (22).

* * * * *